United States Patent [19]

Alavi et al.

[11] Patent Number: 5,377,920

[45] Date of Patent: Jan. 3, 1995

[54] METHOD FOR THE DISPOSAL OF NICKEL-CADMIUM OR NICKEL-HYDRIDE CELLS

[75] Inventors: Kamal Alavi, Walchwil; Bahman Salami, Rotkreuz, both of Switzerland

[73] Assignee: Inter-Recycling AG, Kussnacht, Switzerland

[21] Appl. No.: 110,434

[22] Filed: Aug. 23, 1993

[30] Foreign Application Priority Data

Sep. 2, 1992 [CH] Switzerland ............... 02750/92-8

[51] Int. Cl.⁶ ................. B02C 23/30; B02C 23/14
[52] U.S. Cl. ........................ 241/17; 241/19; 241/20; 241/24
[58] Field of Search .............. 241/15, 18, 17, 19, 241/22, 23, 24, 25, 29, 30, DIG. 38; 29/403.1, 403.3, 403.4

[56] References Cited

U.S. PATENT DOCUMENTS

| | | | |
|---|---|---|---|
| 3,905,556 | 9/1975 | Drage | 241/DIG. 38 X |
| 4,026,477 | 5/1977 | Tremolada | 241/24 X |
| 4,042,177 | 8/1977 | Cestaro et al. | 241/24 X |
| 4,384,683 | 5/1983 | Huwald et al. | 241/24 X |
| 4,397,424 | 8/1983 | Zappa et al. | 241/24 X |
| 4,637,928 | 1/1987 | Zajac, Jr. et al. | 241/27 X |
| 5,139,203 | 8/1992 | Alavi | 241/24 X |
| 5,217,171 | 6/1993 | Feldmann | 241/24 |

Primary Examiner—Timothy V. Eley

[57] ABSTRACT

Waste material, consisting of collected nickel-cadmium or nickel-hydride cells, after a preliminary reduction in size, is subjected to a subsequent grinding reduction in size and is then screened. The screen coarse fraction (G) is separated into a light fraction (L) and a heavy fraction (H) by means of an air separation, and the later fraction (H) is magnetically separated. The light fraction (L) and the non-magnetic portion (HN) are dried and screened in order to free the non-metallic components (P,PPW) from the predominantly metallic fine portion (S) and so that they can be divided out as a harmless product. The magnetic portion (HM) is mechanically scoured (8) and possibly washed, whereby one obtains a smeltable Ni—Fe mixture. The screen fine fraction (F) and the fine portion (S) resulting from the processing of the coarse fraction (G) are dissolved in thinned acid (HCL). After filtering the acid at least metallic nickel and as the case may be cadmium or metal hydride are selectively extracted from the purified solution. The acid after being cleaned of waste electrolyte (KOH) can be recycled.

10 Claims, 2 Drawing Sheets

METHOD FOR THE DISPOSAL OF NICKEL-CADMIUM OR NICKEL-HYDRIDE CELLS

BACKGROUND OF THE INVENTION

The invention concerns a method for the disposal of nickel-cadmium or nickel-hydride cells.

Nickel-cadmium cells are widely used as backup elements (rechargeable batteries, accumulators) for supplying current, especially for portable electrical and electronic devices. In correspondingly large quantities such cells appear for disposal after they have become unusable or after they have been taken out of service. The main components of these cells are normally:

- Housing (cover) of nickeled steel sheet,
- Grid electrodes of nickeled appertured steel sheet or interwoven wire,
- Sintered nickel powder as well as nickel hydroxide with the grid electrodes
- Cadmium as metallic powder and cadmium hydroxide,
- Isolating intermediate layers (dividers) of pressed synthetic wadding and paper,
- Plastic discs, possibly wood,
- Potassium hydroxide KOH as electrolyte (the portions between metallic Ni and Cd on one hand and their hydroxides vary according to the charge condition).

The orderly collection and disposal of such cells is required, above all because of their high content of highly toxic cadmium (around 20%), but also because of the nickel as well as the electrolyte; and on the other hand nickel and cadmium are also relatively valuable metals, for which a lively demand exists. Also, so called nickel-hydride cells have been known for some time and have increasingly come into use. In this type of rechargeable battery cadmium and cadmium hydroxide are replaced by special metal hydrides, for example titanium-nickel hydride, iron-titanium hydride, lanthanum-nickel hydride, etc., and have a high storing capacity for hydrogen. Although these cells do not include toxic cadmium, nevertheless they pose in a similar way the problem of disposal and the regaining of scarce valuable materials.

A state of the art disposal and retrieval by sorting of the valuable components of this kind of "waste" poses considerable difficulties, mainly because of the very compact laminated and partially sintered construction of the cells. Previously, essentially two methods were known and technically used:

According to a pyrolytic method the initially reduced in size waste material is heated to above 400° C. in the presence of oxygen, whereby the Ni-hydroxide and Cd-hydroxide decompose and the organic components scorch. The residue is then heated to over 900° C. with carbon, whereby the cadmium vaporizes and is retrieved by distillation. The remaining Ni and Fe can be delivered to ferro-nickel production. This method is uneconomical in that it has a high energy requirement and more than 30% slag is produced, which itself has to be disposed of. Especially, the control of the Cd vapor and the exhaust gas cleaning are expensive.

In the second method the entire waste mass is dissolved in mineral acid. The acid bath is then filtered, and the dissolved metals are individually acquired. The unavoidable decomposition of the entire metal content, including the iron, demands a large mass of acid and a corresponding extensive installation for the purification and maintenance of the acid bath.

According to an earlier, not previously published proposal for the processing of Ni—Cd batteries (CH Patent Application No. 3466/91-9 of Nov. 27, 1991) the waste mass is cooled with liquid nitrogen and embrittled and then reduced in size to 5 to 10 mm. The granules are subsequently washed and thereby freed of soluble electrolyte, then dried at 80° to 90° C. and then ground in a ball mill. Following this the mill product is separated into fractions largely by mechanical means and partially by renewed milling. According to this proposal most of the aforementioned difficult disadvantages can indeed be avoided, yet a satisfactory material separation—especially in the effective separation of the cadmium—is not achievable. It should be mentioned, that such difficulties are in part traceable back to the material processing by ball mills, which effects a partial compacting of the waste particles and makes considerably more difficult the subsequent mechanical material separation, especially by screens. Unfavorable moreover is the large requirement of wash water and the expense for its cleaning, as well as the energy and time expense for the drying of all of the materials.

SUMMARY OF THE INVENTION

The object of the present invention is to regain as again worthwhile raw materials, and as completely as possible and in sufficient purity, the metal waste components—especially nickel, cadmium and as the case may be metal hydride—in an effective environmentally acceptable way, with the unavoidable residue being essentially free of heavy metals so as to be of a disposable character.

This object is solved in accordance with the invention by a method of disposing of a nickel-cadmium or nickel-hydride cells wherein after a preliminary reduction in size in a shredder, waste material is subjected to a grinding reduction in size in a cross-shear cutting shredder and is subsequently screened to form a screen coarse fraction and a screen fine fraction. The screen coarse fraction is separated by air into a light fraction and a heavy fraction, and the heavy fraction is then separated magnetically separation into a magnetic portion and a non-magnetic portion. The light fraction and the non-magnetic portion are air dried and screened in order to separate the non-metallic components from the predominantly metallic fine portions. The magnetic portion is freed of adhering electrolyte and predominantly metallic fine portions by mechanical scouring and/or washing in order to obtain a smeltable nickel-iron mixture. The screen fine fraction as well as at least the fine portion produced by air separation is subjected to an acid bath to dissolve the metallic portions. After filtering out the undissolved components from the acid bath, at least the metallic nickel is selectively extracted.

The advantages of the method of the invention are above all to be seen in that the waste material is first, by exclusively mechanical and "drying" method steps, extensively separated into desired fractions; and wet chemical processes and as the case may be a washing operation are thereafter first used only on the partial masses and are specifically directed to these. Such "wet" method steps therefore are formed essentially in a rational way and are effective. Altogether a very good material separation is achieved at a bearable energy expense and with favorable material flow.

BRIEF DESCRIPTION OF THE DRAWINGS

An exemplary embodiment of the invention, with variations, is described in more detail hereinafter in connection with the drawings.

DESCRIPTION OF THE PREFERRED EMBODIMENTS

Figure 1:
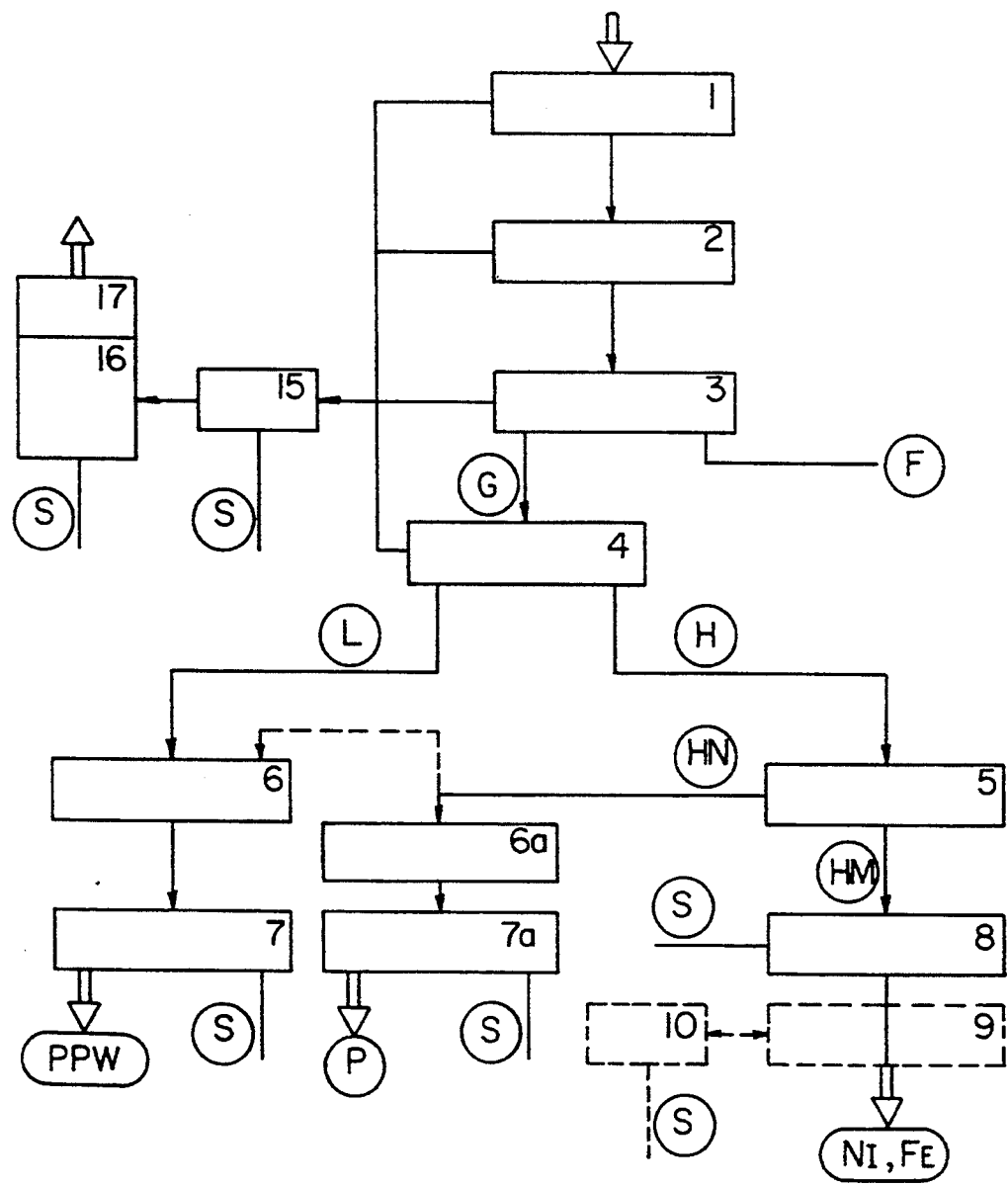
FIG. 1 illustrates schematically by way of a flow diagram a first part of the method, which principally concerns the processing of the coarse fraction of the screen.
Figure 2:
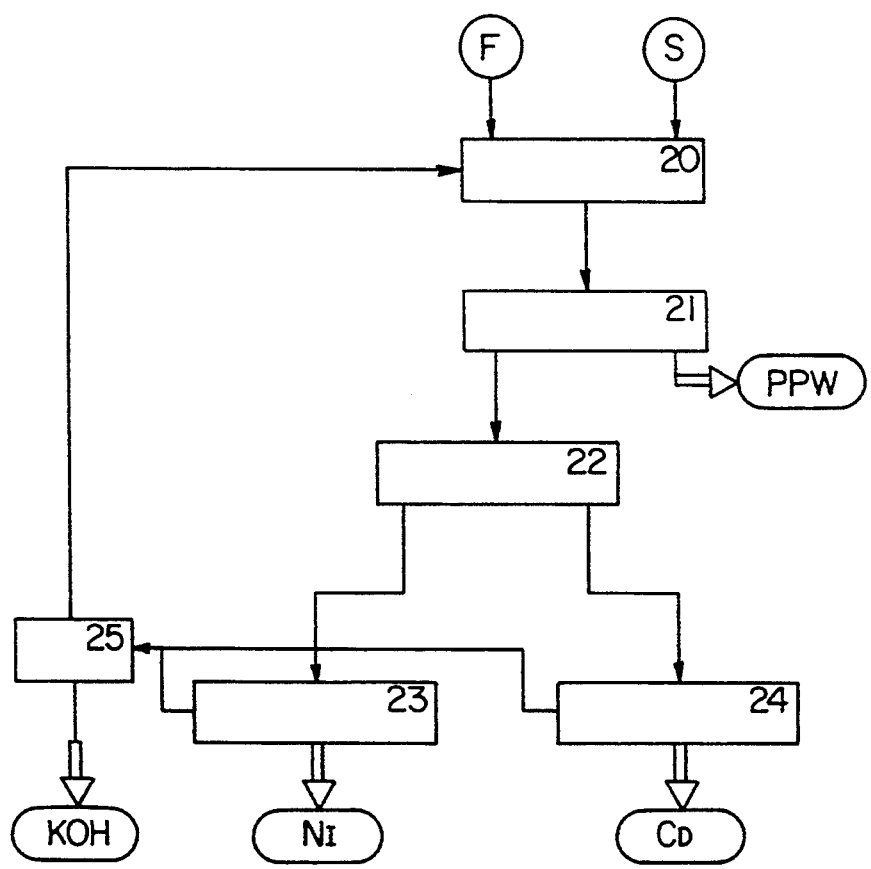
FIG. 2 shows in an analog representation the processing of the fine fraction of the screen and at other places the gathered fine portions.

FIGS. 1 and 2 illustrate on one hand the essential method steps for the disposal of nickel-cadmium cells (batteries), but they permit also a recognition of the general construction of a corresponding apparatus.

The scrap material—collected Ni—Cd batteries—is first, in accordance with FIG. 1, submitted to a preliminary reduction to smaller pieces in a shredder 1, a customary relatively slowly running cutting mill with parallel cutting knives. After this there follows a subsequent grinding size reduction of the waste material, whereby on one hand the sheet parts are cut into small pieces, but simultaneously are freed by grinding of powdered material sintered and pressed onto them. Especially suited for this subsequent size reduction is a cross shear cutting shredder "Rotoplex" of Alpine Aktiengesellschaft Augsburg, Type 28/40 to 63/100 according to Prospekt 164-166/1d, with open cross shear cutting rotor, which rotates at a relatively high rotational speed (up to 1500 rpm). It has been demonstrated that the subsequent size reduction of the material in such a type of cutting mill (also referred to as a "grinding shredder'-')—in contrast to material fragmentation in a ball mill or hammer mill—basically mechanically disintegrates the waste material and thereby essentially facilitates or in general first makes possible the subsequent material separation.

Following the above, the subsequently reduced in size waste material is separated by a vibratory screen 3 into a screen fine fraction F (particle size smaller than about 1 mm) and into a screen coarse fraction G. The processing of the screened fine fraction F is further described below in connection with FIG. 2.

The coarse fraction G produced by the screen, typically having a weight proportion of about 45 percent, consists mainly of chips of nickeled steel plate, mixed with non-metallic components (paper, plastic, wadding, PPW), nickel and cadmium powder as well as damp electrolyte. This coarse fraction G is separated in an air separator 4 into a heavy fraction H and a light fraction L. The air current of the air separator 4 is conducted through a cyclone 15 and subsequently a dust filter 16. The shredder 1, the grinding shredder 2 and the screen 3 are also preferably encapsulated and pneumatically dedusted, with the dust laden exhaust air likewise being conducted through the cyclone 15 and the dust filter 16. An adsorption filter 17 (active charcoal) can be connected to the dust filter 16 so that upon the exhaust of the air into the atmosphere it has no smell. The predominantly metallic fine portion S produced in the cyclone 15 and the dust filter 16 is collected; and the processing of this fine portion is further described below.

The heavy fraction H escaping from the air separator 4 is separated, by means of a magnetic separation 5, into a magnetic portion HM and a non-magnetic portion HN. The above-mentioned light fraction L from the air separator, and also the non-magnetic portion HN from the magnetic separator, are then dried, for example each in a heated drum 6 or 6a, respectively, to 70°-80° C., and is then delivered to a vibratory screen 7 or 7a, respectively. Here the still existing fine portion S, especially cadmium and nickel powder as well as crystalized electrolyte KOH, is separated out. The screen residue—the main portion comprising non-metallic components (paper, plastic and wadding) and a part of the electrolyte of the waste material—is non-toxic waste practically free of heavy metals which can be disposed of without problem, for example by burning (weight proportion about 5%). As a result of the weight separation in the air separator 4 the light fraction L contains predominantly paper and wadding (and only small portions of plastic), and the heavy portion H in comparison contains predominantly plastic, which in the vibratory screen 7a becomes the residue P from the non-magnetic portion HN. Insofar as this involves plastic material of high value (in the involved cells polyolefine is used to a large extent for isolating spacers), the obtained plastic mass P can be recycled, especially by being used again in the manufacture of cells. On the other hand, when such reuse is not worthwhile, the non-magnetic portion HN together with the light fraction L can be processed in the devices 6 and 7, as indicated by the broken lines.

The magnetic portion HM resulting from the magnetic separation 5 is on one hand freed of adhering electrolyte and predominantly metallic fine parts S by means of a mechanical scouring treatment 8. This treatment can, for example, be carried out by means again of a vibratory screen. Especially effective however is a (known in itself) relatively slowly rotating screen drum with a charge of abrasively working coarse grained granules. Such a drum can operate on the magnetic portion HM batch-wise or continuously. Thereby there is produced again a fine portion S and it contains a sufficiently purified iron-nickel mixture Ni—Fe, which can be delivered to a smelting operation, especially of ferro-nickel metallurgy (weight proportion about 37%).

In the case of special requirements (high purity of the Ni—Fe mixture) a washing operation 9 for the magnetic portion HM may be necessary, which is indicated by the broken lines. As the washing fluid in the bath 9 a thinned to heavily thinned acetic acid is especially suited, which works detergently and on metal slightly solvently and has good wetting ability. A lye solution or solely water can however also come into question. The washing process is practically supported by the application of ultrasonic action. The washing fluid circulates through a filter 10 and/or is periodically distilled, whereby as a residue a fine portion S is again obtained.

By means of the aforegoing scouring treatment 8 the material is already largely mechanically freed of fine portions S (including adhering electrolyte), so that as the case may be the load on the washing fluid is reduced and its preparation is considerably eased. In the case of certain given conditions the washing treatment can on the other hand entirely replace the mechanical scouring.

With respect to FIG. 2, the further processing of the screen fine fraction F as well as of the fine portion S resulting from the method steps of FIG. 1 will now be described. In the fine fraction F, having a weight proportion of for example about 55%, are contained the portions of essentially nickel and cadmium powder (both metallic and as hydroxide), further a portion of the electrolyte KOH and a rather small portion of the non-metallical components PPW.

The screen fine fraction F together with the comparatively small amount of obtained fine portion S is dissolved in an acid bath 20 of thinned hydrochloric acid HCL (4M). In a following filter 21 the acid with the dissolved metal passes through the filter, while insoluble components, especially residual paper, plastic and wadding PPW is separated out as filter residue and is disposed of.

In a following extraction stage 22 a nickel solution on one hand and a cadmium solution on the other hand is extracted from the purified solution mixture. The two solutions each proceed to a membrane-electrolyte cell 23 or 24, respectively, in which metallic reusable nickel or cadmium is separated out. In all events, in a corresponding away other metals which have gone into solution, for example iron, can be extracted from the acid.

From the two cells 23 and 24 the thinned acid is practically conducted through a purifying stage 25 in order to be separated from the electrolyte KOH carried by the fractions F and S. The so purified acid is recirculated to the acid bath 20. The described circulation process and chemical or electrochemical reactions can take place either batch-wise or continuously.

Although the previously described exemplary embodiment is concerned with nickel-cadmium cells, it is easy to understand that basically the same method can be used with nickel-hydride cells. In such cells the metal hydride is contained in powder form, possibly sintered, and it is separated by the described mechanical method steps in place of the cadmium and is retrieved. A corresponding adaptation requires naturally the wet chemical stages 22, 23 and 24. In all cases at least metallic nickel is selectively extracted, and according to the application also cadmium, metal hydride and as the case may be other metals.

We claim:

1. A method for disposing of nickel-cadmium or nickel hydride cells by means of mechanical reduction in size, said method comprising the steps of:
   reducing the cells to smaller pieces in a shredder;
   grinding the pieces in a cross shear cutting shredder;
   screening the ground pieces to form a screen coarse fraction (G) and a screen fine fraction (F);
   separating the screen coarse fraction (G) by means of an air separator into a light fraction (L) and a heavy fraction (H);
   separating the heavy fraction (H) by means of a magnetic separation into a magnetic portion (HM) and a non-magnetic portion (HN);
   drying and subsequently screening the light fraction (L) and the non-magnetic portion (HN) in order to separate the non-metallic components (P,PPW) from predominantly metallic fine portions (S);
   mechanically scouring and/or washing the magnetic portion (HM) to free the magnetic portion (HM) of adhering electrolyte and predominantly metallic fine portions (S) to obtain a smeltable nickel-iron mixture (Ni,Fe);
   subjecting the screen fine fraction (F) as well as at least the fine portion (S) produced by the air separation to an acid bath to dissolve their metallic portions, and
   filtering out the undissolved components (PPW) from the acid bath and subsequently selectively extracting at least the metallic nickel (Ni) from the acid bath.

2. The method according to claim 1, characterized in that the effective air stream of the air separation is conducted through a cyclone and an air filter in order to separate out the fine components (S) contained therein.

3. The method according to claim 2 characterized in that in the reduction in size and the screening the dust arising from the waste material is carried off pneumatically and is likewise conducted to the cyclone.

4. The method according to claim 1 characterized in that the magnetic portion (HM) is scoured by means of a vibrating screen.

5. The method according to claim 1 characterized in that the magnetic portion (HM) is scoured in a drum screen.

6. The method according to claim 1 further characterized in that the step of washing the magnetic portion (HM) includes the application of ultrasonic activity.

7. The method according to claim 1 further characterized in that a washing fluid used for the washing of the magnetic portion ((HM) is circulated through a filter and/or is periodically distilled.

8. The method according to claim 1 characterized in that thinned hydrochloric acid (HCL) is used for the acid bath.

9. The method according to claim 1 characterized in that the acid of the acid bath is cleaned of waste electrolyte (KOH) and is recycled.

10. The method according to claim 1 characterized in that metallic nickel and cadmium are separately extracted from the acid bath.

* * * * *